United States Patent [19]

Deutsch

[11] Patent Number: 5,712,848
[45] Date of Patent: Jan. 27, 1998

[54] TIME DIVISION MULTIPLEX COMMUNICATIONS SYSTEM INCLUDING MEANS FOR REDUCING UNDESIRED ECHOES RESULTING FROM CIRCUIT DELAYS

[75] Inventor: Brian Mark Deutsch, Maple Valley, Wash.

[73] Assignee: WAVTrace, Inc., Bellevue, Wash.

[21] Appl. No.: 570,538

[22] Filed: Dec. 11, 1995

[51] Int. Cl.$^6$ ................... H04B 1/56; H04L 5/14
[52] U.S. Cl. ................. 370/280; 370/521; 379/58
[58] Field of Search ................. 370/6, 32, 24, 370/29, 84, 109, 118, 95.1, 95.3, 447, 261, 276, 277, 278, 280, 294, 286, 310, 321, 337, 329, 498, 521; 379/406, 407, 58; 455/78

[56] References Cited

U.S. PATENT DOCUMENTS

| | | | |
|---|---|---|---|
| 4,131,767 | 12/1978 | Weinstein | 370/286 |
| 4,525,835 | 7/1985 | Vance et al. | 370/29 |
| 4,630,257 | 12/1986 | White | 370/109 |
| 4,742,514 | 5/1988 | Goode et al. | 370/109 |
| 4,903,257 | 2/1990 | Takeda et al. | 570/29 |
| 4,949,335 | 8/1990 | Moore | 370/29 |
| 5,278,992 | 1/1994 | Su et al. | 455/69 |
| 5,323,447 | 6/1994 | Gillis et al. | 379/61 |
| 5,347,562 | 9/1994 | Candy | 370/29 |
| 5,418,839 | 5/1995 | Knuth et al. | 379/61 |
| 5,495,498 | 2/1996 | Tominaga | 375/200 |

OTHER PUBLICATIONS

"Spread sepctrum goes commercial," Schilling et al., IEEE Spectrum, Aug. 1990, pp. 40-41 and 44-45.

*Primary Examiner*—Chau Nguyen
*Attorney, Agent, or Firm*—Fulbright & Jaworski L.L.P.

[57] ABSTRACT

A transmitter and receiver pair of units for communicating data therebetween. The inter unit transmission in one embodiment is accomplished by using a serial memory associated with the transmitter and a serial memory associated with the receiver. The serial memories are designed to allow data to enter at one speed and to leave at a different speed. The serial memories are reset at precise times. In this manner, the data throughput is increased between the units.

16 Claims, 5 Drawing Sheets

REMOTE UNIT

BASE UNIT

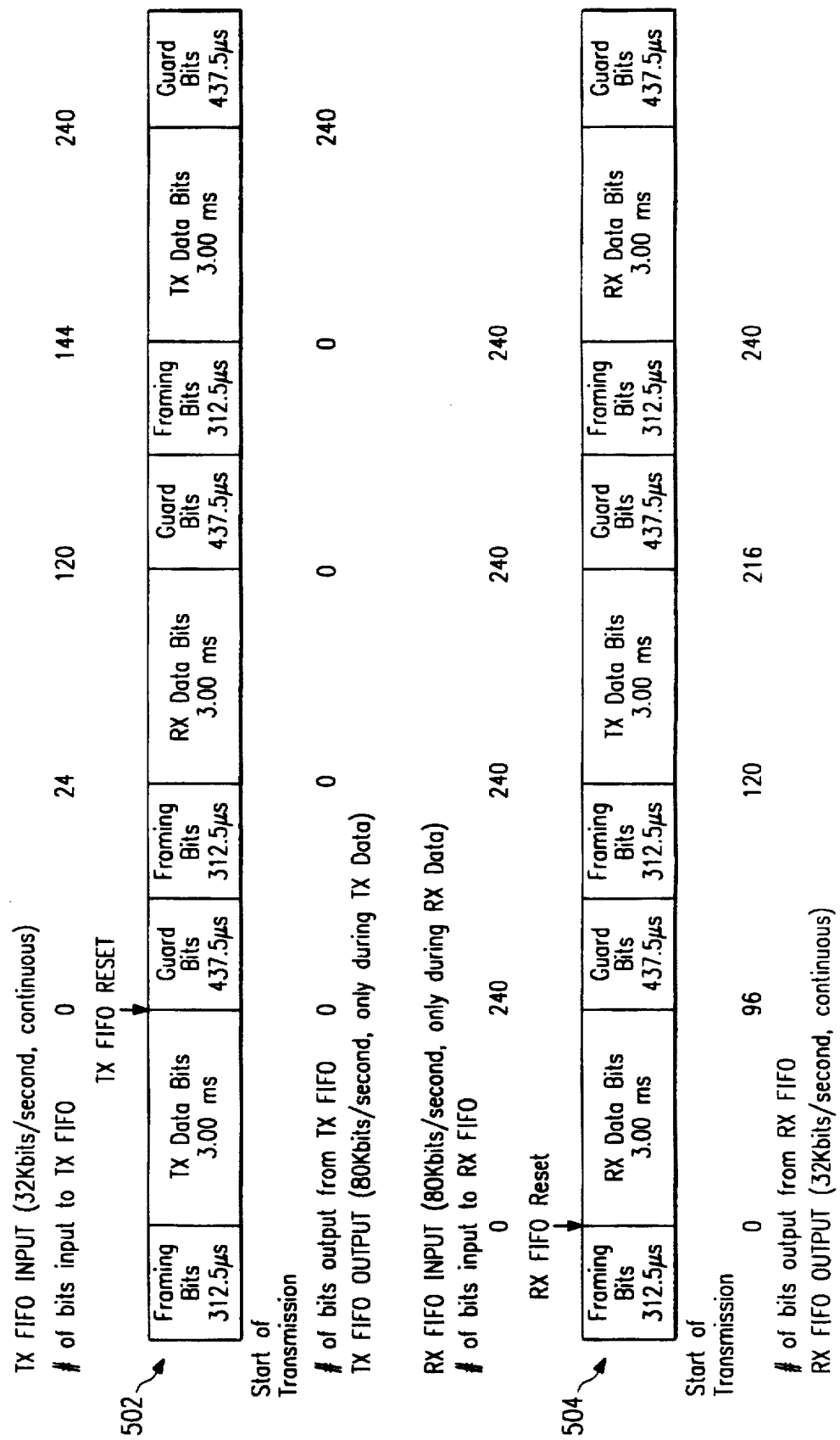

TIME DIVISION MULTIPLEX COMMUNICATIONS SYSTEM INCLUDING MEANS FOR REDUCING UNDESIRED ECHOES RESULTING FROM CIRCUIT DELAYS

TECHNICAL FIELD OF THE INVENTION

The present invention relates to communications systems, and more particularly to communications systems such as cordless telephone systems wherein voice signals are converted to digital signals and transmitted on a radio frequency carrier between transmitter and receiver.

BACKGROUND OF THE INVENTION

In a time division duplex radio system, the receiving and sending units share a common frequency during each communications frame. They split it in half. One transmits during the first half while the other receives and then on the second half the situations are reversed. In such a radio system because of the necessity of talking during half the frame and listening during the other half, it is necessary to cue up a certain amount of data bits for transmission and to also cue up the data bits received for future processing.

When using the time division duplex radio system in combination with a telephone line interface as in cordless telephones, a problem arises because the cueing process causes a delay of the signals as transmitted to the receiver. When used in conjunction with a telephone line interface—which has a finite amount of side tone which is echoed back into the reverse line—this delay manifests itself as an echo received at the originating unit. In essence, the transmitted signal is transmitted to the receiver with a finite delay and then rebroadcast in the reverse direction back to the originating unit which causes a perceived echo if that delay is greater than a certain amount of time.

As an example, it has been found that a delay of 12 milliseconds seems to be the maximum time for a speech to be perceived as undisturbed. In a normal telephone, the side tone is returned directly from the transmitter to the receiver and does not suffer a delay at all. In a digital radio situation where there is cueing of the data, if the information were to be fed back to the receiver immediately, it would be out of sync with the time that some data is being heard at the other end.

Therefore, it is critical that in any system the delay be maintained under approximately 12 milliseconds or the talker will perceive that there's an echo and will consider the telephone service to be degraded. One way to overcome this problem is to have very short time frames where very small groups of information are transmitted very rapidly. This would reduce the round-trip delay. However, every time frame has a certain amount of overhead attached to it; and, thus, a situation would occur that during a frame most of the data being transmitted would be overhead and very little would be actual data. This would in turn, cause the data rate to increase which would decrease spectrum efficiency. So, therefore, it is economically essential to have the frames as long as possible; thereby, communicating as much data as possible during one frame. This makes the efficiency of the transmission greater.

In the prior art, the most straightforward approach to the cueing of data bits has been the use of a double buffer in which an entire frame of data is cued up and then latched into a separate buffer, such that that data could be output when required by the link while the first buffer continues to cue for the next communications frame. One buffer is read out while the record buffer is being loaded with data. The problem with this scheme is that it actually incurs more time delay by cueing an entire frame of data on either side of the link. Thus, if a communications frame is, for instance, 8 milliseconds long, at least 16 milliseconds of round-trip delay will occur due to double cueing on either side.

Therefore, it is one object of the present invention to provide a system wherein the communications frame is as long as possible to promote better efficiencies in a communication link, while at the same time, limiting echo or delay time back from the listener to the talker to a predetermined limit such as 10 milliseconds.

SUMMARY OF THE INVENTION

The present invention achieves its goals by using sequential memory (referred to as "FIFO"), where the data is serially shifted in and serially shifted out in an isochronous manner. That is, the speed of the data coming in may not equal the speed of the data coming out of the FIFO buffer.

Data acquired from the voice signal is encoded into a 32-kilobit per second format and stored in a transmitting FIFO buffer and then retrieved from this FIFO buffer at an 80-kilobit per second rate to be put out onto the communications link. At a remote unit, the receive FIFO buffer has data input at an 80 kilobit rate, the output of the receiver FIFO buffer is fed into a CODEC at 32 kilobits/second to be, in turn, converted to a voice signal.

In order to reduce the amount of delay in the link system, the system embodying the present invention resets the FIFOs at specific times during the acquisition of the call in order to ensure that only the smallest amount of data is cued up for retrieval and transmission by the system. There must be a sufficient number of data bits in the transmit buffer such that when transmission of this data begins during each frame, there are enough bits in the buffer for efficient and echo free communications.

A frame may contain 240 data bits. Therefore, there must be sufficient data bits in the transmit (TX) FIFO at the beginning of that transmission such that by the end of the transmission, the number of bits originally in the TX FIFO plus the number of bits to be put into the TX FIFO during the transmission at 32 K bits/s equals the number of bits that are sent out of the TX FIFO at 80 K bits, in this case 240 data bits. Conversely, at the receiver (RX) as the 240 data bits come in, at the beginning of the incoming burst of data the RX FIFO must be completely emptied so that all 240 data bits will be stored in the receive FIFO buffer without any of the previous data preceding it and causing more delay.

Accordingly, it is one feature of the present invention to use a sequential memory based FIFO buffer in order to cue up the data bits in a time division duplex system.

It is another feature of the present invention to reset the FIFOs at very precise times in order to minimize the amount of delay from transmit to receive and from receive back to transmit.

It is a still further feature of our system to acquire data from the audio coder/decoder (CODEC) at 32 kilobits into one side of the TX FIFO buffer and to output it out of the other side at 80 kilobits when the link requires that data and conversely to take data into the RX FIFO off the link when in the receive mode at 80 kilobits and output it at 32 kilobits back to the CODEC to be converted to speech signals.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a timing diagram of the system embodying the present invention.

DETAILED DESCRIPTION OF A PREFERRED EMBODIMENT OF THE INVENTION

Figure 1:
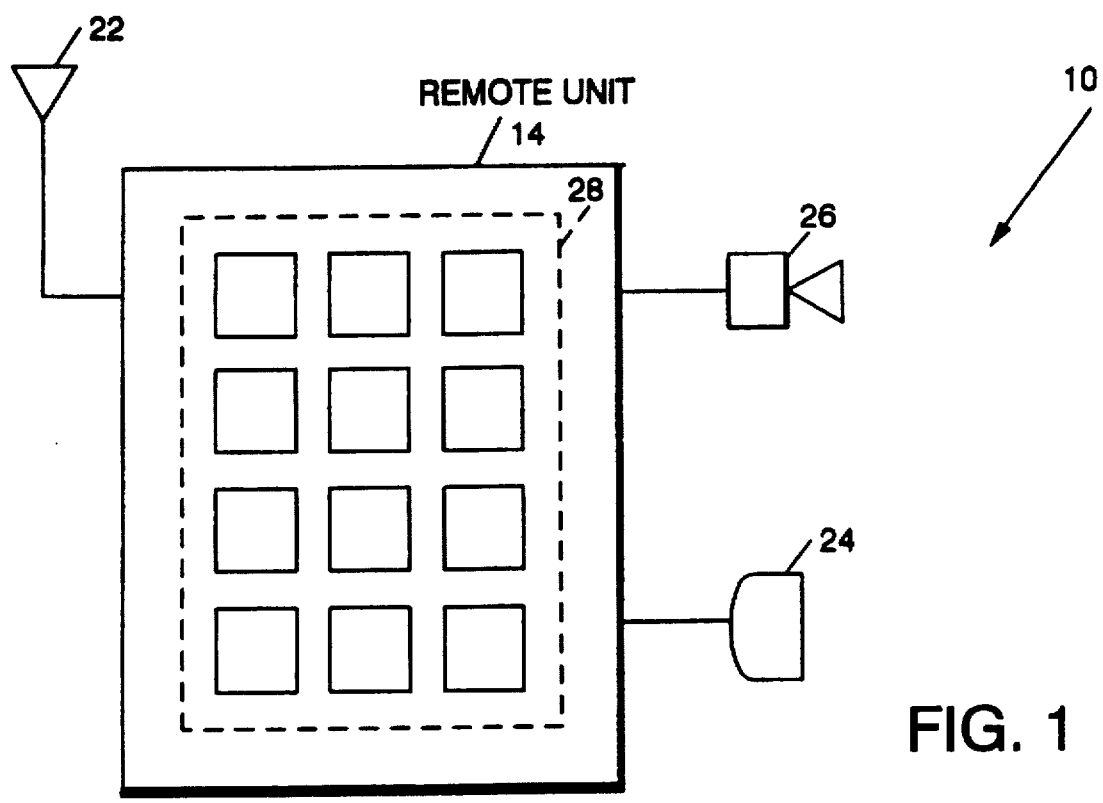
FIG. 1 is a block diagram of a communications system in accordance with a preferred embodiment of the present invention having first and second communications units.
Figure 1:
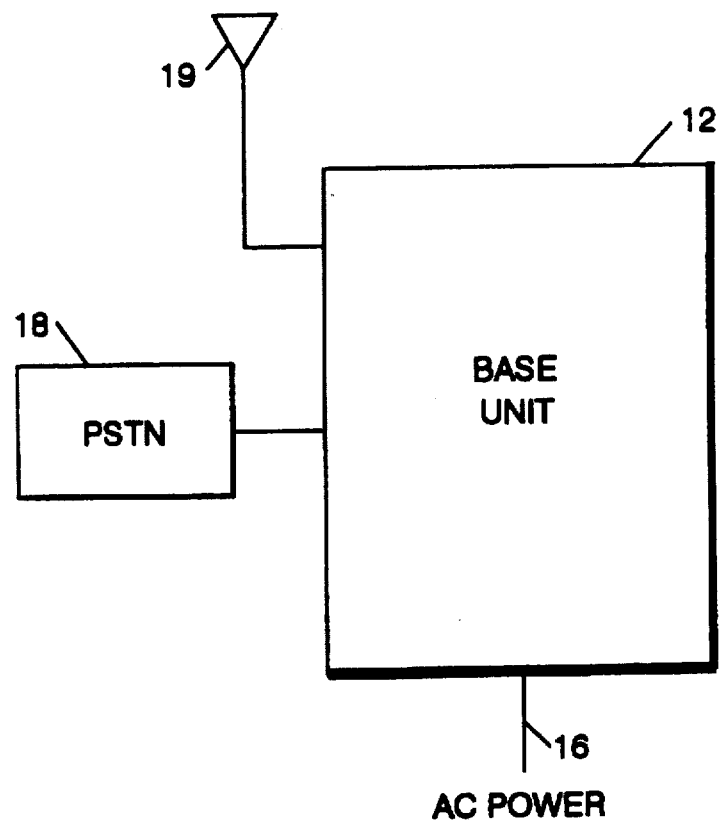

Referring now to FIG. 1, a communications system embodying the present invention will be described.

Communication system 10 includes a base unit 12 and a remote unit 14.

Base unit 12 in one embodiment receives its power from the alternating current power supply by the power utility on lines 16 and is connected to a public switching telephone network (PSTN) 18. Also, base unit 12 includes an antenna 19 for communications with remote unit 14. Remote unit 14 communicates with base unit 12 by transmission and reception of radio frequency signals through antenna 22. Remote unit 14 also may include a microphone 24 and a speaker or earpiece 26 for conversion of signals between sound (acousta) and electronic form. In addition, remote unit 14 may also include a keypad of the DTMF type.

Figure 2A:
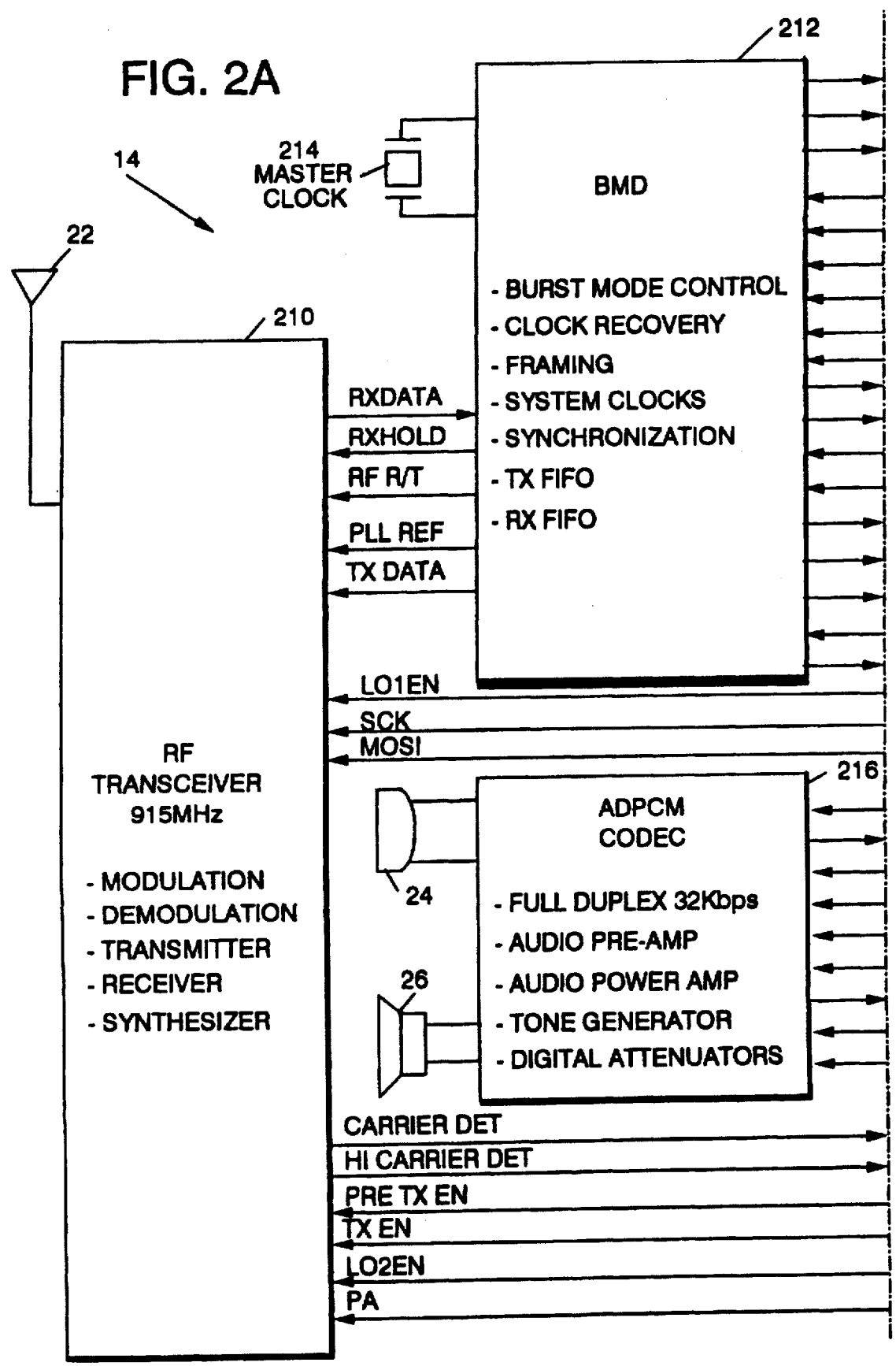
FIG. 2 (consisting of FIGS. 2A and 2B) is a block diagram of one of the communications units of FIG. 1 in accordance with a preferred embodiment of the present invention.
Figures 2, 2B:
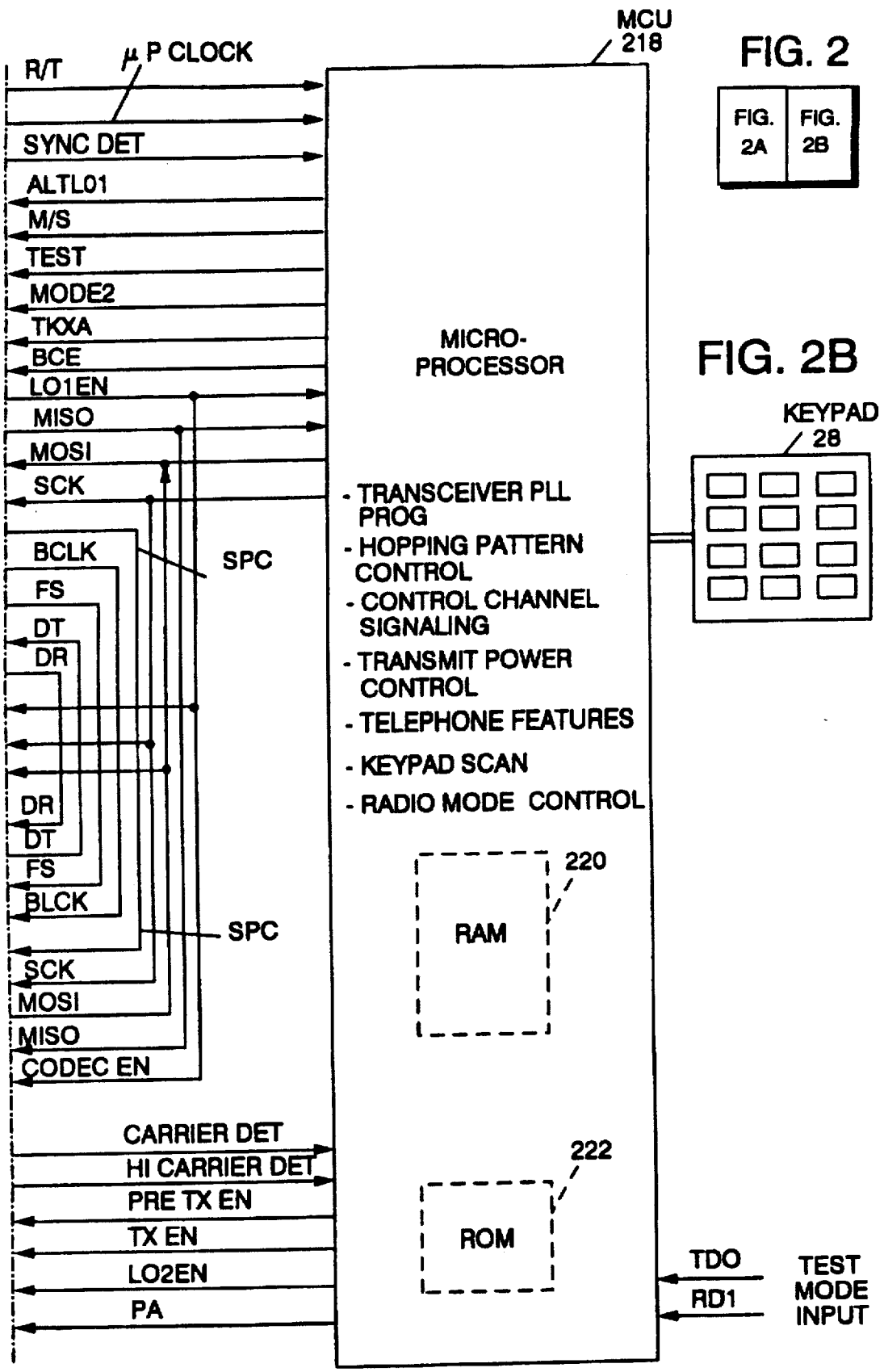

Referring now to FIG. 2, one unit of communication system 10, for example remote unit 14, will be described in greater detail.

It should be noted that the communications functions, including transmit power and frequency control described with reference to remote unit 14 will be the same for base unit 12. Base unit 12 may or may not include a keyboard 28 and most likely will not include a microphone 24 and an ear piece or speaker 26 as does the remote unit 14.

Remote unit 14 communicates with base station 12 through RF transceiver 210 which receives signals from and transmits signals to base unit 12 through antenna 22.

The RF transceiver provides a frequency synthesizer, an RF receiver, an RF transmitter and modulation and demodulation functions in remote unit 14. Burst mode device 212 communicates with transceiver 210 to control burst mode operation to recover clock signals and to synchronize data frames between the base unit 12 and the remote unit 14. Burst mode unit 212 also controls sequencing and outputting of data from the ADPCM CODEC.

The burst mode device 212 has as a fundamental frequency control a master clock 214 which provides timing signals to permit the burst mode device 212 to generate clocking signals to other functional units in remote unit 14.

ADPCM CODEC 216 converts sound information received by microphone 24 to electrical signals, amplifies the electrical audio frequency signals, and converts the audio frequency signals to digital representation by means of an analog to digital converter (ADC). ADPCM CODEC 216 also includes a digital to analog converter (DAC) for converting received information in digital form to analog form. An audio power amplifier amplifies the converted analog information and provides it to speaker 26 for conversion to sound for the user. A pulse code modulation technique is used in the ADC and in the DAC. The pulse trains are provided to the burst mode device 212 for storage in a transmit temporary storage device, such as a FIFO buffer, for transmission to transceiver 210 at an appropriate time to be transmitted in one or more transmission frames. Conversely, burst mode device 212 receives incoming data from RF transceiver 210 and stores the incoming data in pulse code format in a receive buffer which may be an FIFO buffer for transmission to the ADPCM CODEC 216 for conversion to an analog signal for amplification and conversion to sound in speaker 26.

The functions described above for remote unit 14 and similarly for base unit 12 are controlled by mode control unit 218.

Mode control unit 218 includes a microprocessor such as a model 6805C8 commercially available microprocessor, a random access memory 220, and a read only memory 222. Mode control unit 218 is connected to keypad 28 for entry of DTMF signals and to burst mode device 212, ADPCM CODEC 216 and to RF transceiver 210. MCU 218 controls all the functions in unit 14. For example, mode control unit 218 controls the phase lock loop (PLL) programming for transceiver 210, the frequency hopping pattern control, control channel signaling for synchronization, transmit power control for RF transceiver 210, mode control for RF transceiver 210 and other telephone features which are not significant to the present invention. Data related to mode control are stored in random access memory 220, which is a part of mode control unit 218, and bootstrap code and basic control code for microprocessor 6805C8 is stored in read only memory 222.

Frequency control coefficients for RF transceiver 210 are stored in random access memory 220 in mode control unit 218. A table in RAM 220 stores the pattern of frequency hopping which will control transceiver 210.

MCU 218 also interprets data in the form of received signal strength indicator (RSSI). The RSSI signal and signals indicating channel quality are used to determine if low power signal frequency transmission is sufficient to maintain quality communication or if higher power frequency hopping transmission is required to maintain communication over the communication channel.

Figure 3:
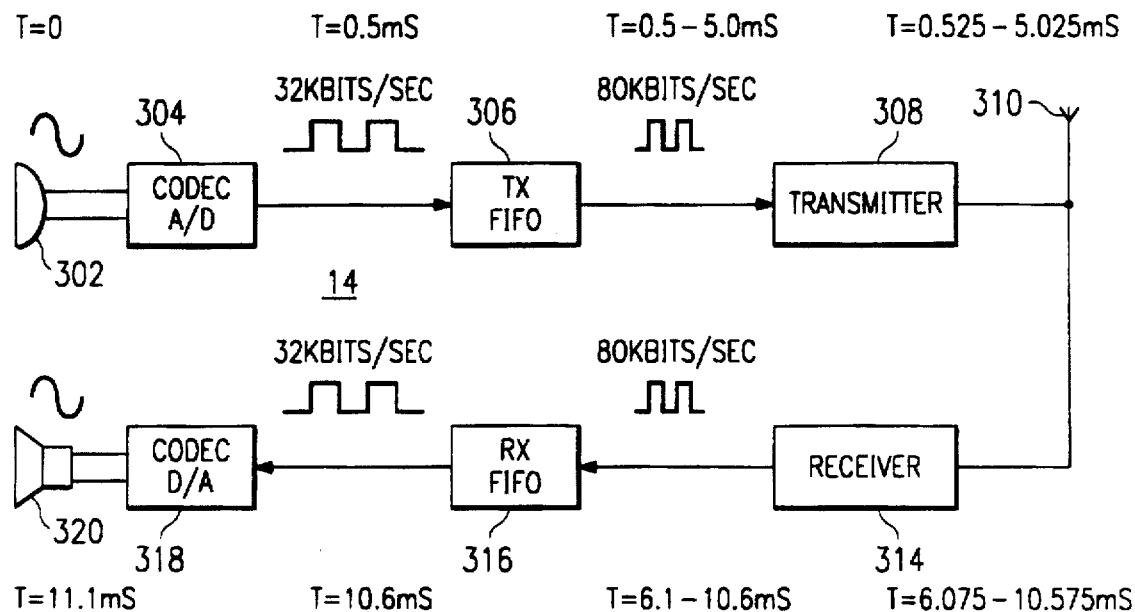
FIG. 3 is a block diagram of the data path of a remote unit according to the present invention.

Referring now to FIG. 3, the data path of remote unit 14 voice to digital to radio frequency signal will be described.

A voice signal is presented to transducer 302 which converts the voice signal to an analog electrical signal which is presented as an input to coder/decoder (CODEC) 304. CODEC 304 converts the analog signal to a digital signal having a data rate of 32 kilobits/second. The output of CODEC 304 is a digital data string which is input at the 32 Kb rate to transmitter FIFO buffer 306. FIFO buffer 306 may be implemented by a RAM device having two ports. The first port being the input port which operates at the 32 Kb rate and the second port being the output port which outputs data from FIFO 306 at an 80 Kb rate. The output data from transmit FIFO 306 is sent to transmitter 308 which uses the data to modulate a radio frequency signal which then is transmitted through antenna 310.

Figure 4:
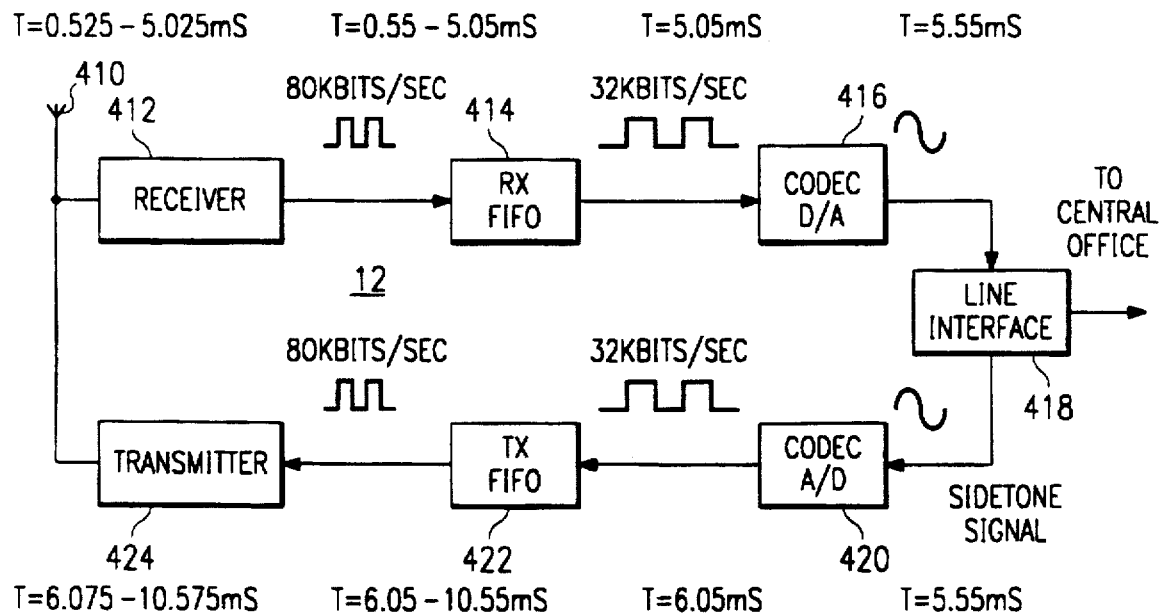
FIG. 4 is a block diagram of the data path of a base unit in a communications system according to the present invention.

Turning to FIG. 4, the receiving station, base unit 12 receiving antenna 410 receives the modulated radio frequency signal from transmitting antenna 310 (FIG. 3) and passes the radio frequency signal to receiver 412 which recovers the data from the carrier by demodulation and produces a data stream at an 80 Kb rate which is then input to receiver FIFO 414. Receiver FIFO 414 is an analog of transmit FIFO 306 except that data input is at the 80 Kb rate and data output is at the 32 Kb rate. The output data from receiver FIFO 414 is input to CODEC 416 which converts the digital data at the 32 Kb rate to an analog signal which is then sent to telephone line interface 418 for transmission through the phone system to the other party.

Considering now the time delay through this system, elements of the present invention will be more clearly understood.

From the initiation of a voice signal at transducer 302 (FIG. 3) to the output of CODEC 304, there is a delay of approximately 0.5 milliseconds (ms). Additional delay is encountered by having data pass through FIFO 306. The magnitude of this delay may be between 0 and 4.5 ms. Thus, the total delay from initiation to the output of transmit FIFO 306 may be between 0.5 ms and 5 ms. Additional delay through transmitter 308 of 25 microseconds (μs) in the transmitter path results in a total delay to the transmit antenna 310 from the initiation of the voice signal in the range of 0.525 ms to 5.025 ms.

The radio frequency signal from antenna 310 in the remote unit 14 is received by received antenna 410 in base unit 12 (FIG. 4) with a delay of approximately 0.525 ms to 5.025 ms. It should be noted that the transmission delay of the radio frequency signals from transmit antenna to receive antenna are of very little consequence since radio signals travel at approximately 1 foot per nanosecond in air. Thus, even if the base unit and the remote unit were one mile apart, the delay for transmission of radio frequency energy from transmit antenna to receive antenna would be in the range of 5 μs which is less than one-half of one percent of the total delay due to the logic system. Also, it should be noted that the voice signal is assumed to originate in the remote unit (FIG. 3) and is transmitted to the base unit 12 (FIG. 4).

The time delays through base unit 12 will be described with reference to FIG. 4. As the radio frequency signals arrive at receive antenna 410 in base unit 12, the delay from the origination of the voice signal is approximately 0.525 ms to 5.025 ms. Delays through receiver 412 and other logic add approximately 25 μs to the delay, resulting in data arriving at the input to receive FIFO buffer 414 with a total delay of between 0.55 ms and 5.05 ms. Receive FIFO buffer 414 controls the delay time such that the total delay at the output of receive buffer 414 is 5.05 ms from origination of the signal regardless of the variable nature of the delay at the input of receive FIFO buffer 414. The digital data then is passed to CODEC 416 which introduces a 0.5 ms delay similar to CODEC 304 in remote unit 14. Thus, the total delay of the analog signal at the output of CODEC 416 is 5.55 ms.

The data then passes through telephone line interface unit 418 where the data is transmitted to the telephone system's central office for communication with another party as is well known in the art. Additionally, a side tone signal is generated by the telephone line interface unit 418 which is converted from analog to digital by another CODEC 420 which introduces an additional 0.5 ms delay, making the total delay at the output of CODEC 420 6.05 ms. The data representing the side tone signal then passes through transmit FIFO buffer 422 which introduces a variable delay of between 0 and 4.5 ms, resulting in a variable delay at the output of FIFO buffer 422 of between 6.05 ms and 10.55 ms.

As before, 25 μs of system delay is added between the output of transmit FIFO buffer 422 and transmit antenna 410 as the signal passes through transmitter 424. Thus, the total delay at the radio frequency output at antenna 410 is between 6.075 ms and 10.575 ms. The side tone modulated radio frequency signal is received by receive antenna 310 of remote unit 14 with a total delay of between 6.075 ms and 10.575 ms. Delays through receiver 314 which demodulates the data from the radio frequency carrier signal adds a delay of 25 μs resulting in a total delay at the input of receive FIFO buffer 316 of between 6.1 ms and 10.6 ms.

Receive FIFO buffer 316 controls the delay such that the total delay at the output of receive FIFO buffer 316 is stabilized at 10.6 ms regardless of the variable delay at the input of receive FIFO buffer 316. An additional 0.5 ms delay is introduced in the digital to analog CODEC 318 resulting in a total delay of 11.1 ms at transducer 320, which converts the analog signal to sound.

FIFO buffers 306, 316, 414 and 422 each provide a maximum delay of 4.5 ms and a minimum delay of 0 ms thus providing the capability of stabilizing the total system delay at the output of each of the FIFO buffers to a fixed delay time based upon system considerations. Among the system considerations which determine the required range of delay through FIFO buffers 306, 316, 414 and 422 is the input and output data rate for each FIFO buffer.

Generally, data is continuously arriving at an input to a TX FIFO buffer so that the buffer does not have to be completely full of data to begin to output data from a FIFO buffer. Since a 240 bit data stream has been selected as the optimum value for the system in accordance with the present invention, a transmit FIFO buffer may have somewhat fewer bits stored in the FIFO buffer prior to the beginning of a transmission.

For example, assuming that a transmit FIFO buffer such as 306 has stored 144 bits, the first bit of the data stream from transducer 302 would have a 4.5 ms delay while the last bit to arrive from transducer 302 in a particular data stream would have a 0 ms delay since the system is designed such that FIFO 306 is empty at that point and the last data bits arriving at FIFO 306 would be immediately transmitted through transmitter 308.

On the receive side of remote unit 14 (FIG. 3+), receive FIFO buffer 316 is empty at the beginning of the receive frame but it empties to the CODEC 318 at a 32 Kb rate while it is filled from receiver 314 at an 80 Kb rate. Thus, the first bits to arrive have a 0 ms delay as they are passed immediately through the FIFO buffer 316 to CODEC 318 whereas the last bits to arrive have been stored in FIFO 316 and take the full 4.5 ms to move through FIFO 316 to the input of CODEC 318. The fact that 240 bits may be transmitted while maintaining a maximum of 4.5 ms of delay in each of the FIFO buffers, permits the system to limit total system delay to less than 12 ms as discussed above.

Referring now to FIG. 5, the critical nature of the FIFO reset can be seen. As shown in 502, if the TX FIFO is reset at the end of the TX data interval of the communications frame then the TX FIFO will have received 144 bits of data from the CODEC at 32 K bits/SEC at the beginning of the TX data interval of the following communications frame and 240 bits by the end of the same TX data interval. Currently, during this same TX data interval, the TX FIFO is outputting data at a rate of 80 K bits/sec such that at the end of the interval, 240 bits would have been sent. Had the reset occurred before the indicated time, extra bits would have remained in the TX FIFO which would introduce excess delay in the system. Had the reset occurred after the indicated time, a deficit of bits would result.

In 504, the RX FIFO reset is shown at the beginning of the RX data interval of the communications frame. In this case due to the FIFO construction the moving of the reset pulse in either direction would cause a deficit of bits to occur during the TX data interval.

To reduce undesirable echo to a point where it is not objectionable to the users of the communication system according to the present invention, there must be a total system delay from transmitter to receiver and side tone back to the originating station of 12 ms or less as discussed above. The delay times through this system have been discussed above with respect to FIGS. 3 and 4 for the remote unit and base unit data paths respectfully.

Although the present invention and its advantages have been described in detail, it should be understood that various changes, substitutions and alterations can be made herein without departing from the spirit and scope of the invention as defined by the appended claims.

What is claimed is:

1. A communications system, comprising:

at least one transmitter unit;

at least one receiver unit;

means associated with at least one said transmitter unit for controlling a delay of data to be transmitted, wherein said means for controlling a delay of data to be transmitted comprises a transmitter first-in-first-out buffer; and means associated with at least one said receiver unit for controlling a delay of data received by said receiver, wherein said means for controlling a delay of data received comprises a receiver first-in-first-out buffer;

wherein said transmitter first-in-first-out buffer and said receiver first-in-first-out buffer are precisely reset at periodic intervals to control a system echo, said precise resetting of said buffers operating to clear all data from said buffers.

2. A communications system according to claim 1, wherein said transmitter first-in first-out buffer has a data input at a first rate and data output at a second rate, said second rate being greater than said first rate.

3. A communications system according to claim 1, wherein said receiver first-in first-out buffer has a data input at a second rate and a data output at a first rate, said second rate being greater than said first rate.

4. A communications system according to claim 1:

wherein said transmitter first-in first-out buffer has a data input at a first rate and data output at a second rate, said second rate being greater than said first rate;

wherein said receiver first-in first-out buffer has a data input at a second rate and a data output at a first rate, said second rate being greater than said first rate;

wherein said first rates are substantially equal; and wherein said second rates are substantially equal.

5. A communications system according to claim 4, wherein one of said units includes a microphone for converting sound waves to electrical energy and a speaker for converting electrical energy to sound waves.

6. A communications system according to claim 4, wherein at least one of said units includes a telephone line interface for transmitting analog data from said unit to a telephone system and information from said telephone system to said unit.

7. A communication system according to claim 4, wherein said data transmissions are time division multiplexed between said units.

8. A method of transmitting data between a transmitter and a receiver wherein the data must be received at said receiver and at least a portion of said data sent back to said transmitter, arriving at said transmitter within a fixed period of time after being sent, said method comprising the steps of:

at said transmitter, storing data to be sent in a transmitter first serial memory, said transmitter first serial memory accepting data at a first rate and outputting data at a second rate;

delivering said data outputted from said transmitter first serial memory to a first serial memory associated with said receiver; and at said receiver, storing data received from said transmitter first serial memory in said receiver first serial memory at said second rate and outputting data to a telephone line interface associated with said receiver at said first rate;

wherein said transmitter first serial memory and said receiver first serial memory are precisely reset at periodic intervals, said precise resetting of said first serial memories operating to clear all data from said first serial memories.

9. The method set forth in claim 8 further including the steps of:

at said receiver retransmitting at least a portion of said received data back to said transmitter, said retransmitting step including:

storing said portion of said received data in a receiver second serial memory, said receiver second serial memory accepting data at a first rate and outputting data at a second rate;

delivering said portion of said received data outputted from said receiver second serial memory to a second serial memory associated with said transmitter; and at said transmitter, storing data received from said receiver second serial memory in said transmitter second serial memory at said second rate and outputting data to said transmitter at said first rate;

wherein said receiver second serial memory and said transmitter second serial memory are precisely reset at periodic intervals, said precise resetting of said second serial memories operating to clear all data from said second serial memories.

10. The method set forth in claim 8, wherein said first rate is 32 kilobits per second and wherein said second rate is 80 kilobits per second.

11. The method set forth in claim 8, wherein said delivery steps include the step of:

dividing the transmission of data between said transmitter and said receiver into frames and wherein each said frame handles data in one direction during one part of said frame and data in the opposite direction during another part of said frame.

12. A communication system, comprising:

a transmitter serial memory, said transmitter serial memory capable of simultaneously receiving data at a first rate and outputting said data at a second rate;

a transmitter, said transmitter transmitting a signal comprising said data output from said transmitter serial memory;

a receiver, said receiver receiving said transmitted signal and outputting said data contained in said transmitted signal;

a receiver serial memory, said receiver serial memory capable of simultaneously receiving said data from said receiver at a second rate and outputting said data at a first rate; and a delay period, said delay period comprising a length of time required for data to travel from a transmitter serial memory input to a receiver serial memory output, wherein said delay period is controlled by resetting said transmitter serial memory and said receiver serial memory so that a user does not detect a system echo, said resetting of said transmitter and receiver serial memories operating to clear all data from said memories.

13. The communication system of claim 12, wherein said delay period is determined by said first rate and said second rate.

14. The communication system of claim 12, wherein said second rate is faster than said first rate.

15. The communication system of claim 12, wherein said transmitter serial memory and said receiver serial memory each comprise a first-in first-out buffer.

16. The communication system of claim 15, wherein said second rate is faster than said first rate.

* * * * *